United States Defensive Publication [19] (H) [11] T969,001

Davis et al. [43] Apr. 4, 1978

[54] DYED FIBERS

[76] Inventors: Merton Louis Davis, 3A Palmetto Arms, Camden, S.C. 29020; Lee Oleh Dworjanyn, 819 Milledge Rd., Augusta, Ga. 30904

[21] Appl. No.: 839,319

[22] Filed: Oct. 4, 1977

Related U.S. Application Data

[63] Continuation-in-part of Ser. No. 712,650, Aug. 9, 1976, abandoned.

[51] Int. Cl.[2] ..... D06P 1/00

[52] U.S. Cl. ..... 8/25; 8/39 A; 8/39 B; 8/39 C; 8/41 A; 8/41 B; 8/41 C; 8/177 AB; 8/178 R; 8/179

[57] ABSTRACT

Synthetic organic fibers are dyed to a dark brown to black shade with a mixture of dyes, one of the dyes in the mixture being a green to blue dye having an absorption spectrum in which the peak value of absorbance is between 600 and 700 nanometers, said green to blue dye being further characterized in that the ratio of absorbance at 700 nanometers to the absorbance at the peak value between 600 and 700 nanometers is at least 0.05. The presence of this green to blue dye reduces or eliminates transmittance of red light along the fiber axis, so that no reddish glow is seen when the ends of the fibers are observed. The dark brown to black fibers are thus well suited for use in artificial furs.

10 Claims, No Sheets Drawing,

24 Pages Specification

The file of this unexamined application may be inspected and copies thereof may be purchased (849 O.G. 1221, Apr. 9, 1968).